(12) United States Patent
Xie et al.

(10) Patent No.: US 11,216,914 B2
(45) Date of Patent: Jan. 4, 2022

(54) VIDEO BLIND DENOISING METHOD BASED ON DEEP LEARNING, COMPUTER EQUIPMENT AND STORAGE MEDIUM

(71) Applicants: Tsinghua Shenzhen International Graduate School, Shenzhen (CN); Tsinghua University, Beijing (CN)

(72) Inventors: Xiang Xie, Beijing (CN); Shaofeng Zou, Beijing (CN); Guolin Li, Beijing (CN); Songping Mai, Shenzhen (CN); Zhihua Wang, Beijing (CN)

(73) Assignees: Tsinghua Shenzhen International Graduate School, Shenzhen (CN); Tsinghua University, Beijing (CN)

( * ) Notice: Subject to any disclaimer, the term of this patent is extended or adjusted under 35 U.S.C. 154(b) by 99 days.

(21) Appl. No.: 16/861,052

(22) Filed: Apr. 28, 2020

(65) Prior Publication Data

US 2021/0327031 A1 Oct. 21, 2021

(30) Foreign Application Priority Data

Apr. 15, 2020 (CN) .......................... 202010294520.3

(51) Int. Cl.
*G06T 5/00* (2006.01)
*G06T 7/215* (2017.01)
*G06T 7/38* (2017.01)

(52) U.S. Cl.
CPC .............. *G06T 5/002* (2013.01); *G06T 7/215* (2017.01); *G06T 7/38* (2017.01);
(Continued)

(58) Field of Classification Search
CPC ......... G06T 5/001; G06T 5/002; G06T 7/215; G06T 7/38; G06T 2207/10016;
(Continued)

(56) References Cited

U.S. PATENT DOCUMENTS

| 10,755,395 B2 * | 8/2020 | Yu ......................... G06K 9/6223 |
| 2015/0262341 A1 * | 9/2015 | Nash ......................... G06T 5/50 348/208.6 |

(Continued)

OTHER PUBLICATIONS

Ehret el al "Model blind video denoisng via frame to frame training" IEEE 2019 (Year: 2019).*

(Continued)

*Primary Examiner* — Sean T Motsinger
(74) *Attorney, Agent, or Firm* — Hanley, Flight & Zimmerman, LLC

(57) ABSTRACT

A video blind denoising method based on deep learning, a computer device and a computer-readable storage medium. The method includes: taking a video sequence from a video to be denoised, taking the middle frame in the video sequence as a noisy reference frame, performing an optical flow estimation on the image corresponding to the noisy reference frame and each other frame in the video sequence, to obtain optical flow fields; transforming, according to the optical flow fields, the image corresponding to each other frame in the video sequence to the noisy reference frame for registration respectively, to obtain multi-frame noisy registration images; taking the multi-frame noisy registration images as an input of a convolutional neural network, taking the noisy reference frame as the reference image, performing iterative training and denoising by using the noise2noise training principle, to obtain the denoised image. This solution may achieve the blind denoising of a video.

20 Claims, 8 Drawing Sheets

(52) U.S. Cl.
CPC ............... *G06T 2207/10016* (2013.01); *G06T 2207/20081* (2013.01); *G06T 2207/20084* (2013.01)

(58) Field of Classification Search
CPC ........... G06T 2207/20081; G06T 2207/20084; H04N 5/357–3577
See application file for complete search history.

(56) References Cited

U.S. PATENT DOCUMENTS

| | | | |
|---|---|---|---|
| 2018/0121767 A1* | 5/2018 | Wang | G06K 9/6256 |
| 2020/0304766 A1* | 9/2020 | Pourreza Shahri | H04N 9/7908 |
| 2020/0364834 A1* | 11/2020 | Ferres | H04N 5/2357 |

OTHER PUBLICATIONS

Tassano et al "DVDNET: A Fast Network for Deep Video Denoising" IEEE (Year: 2019).*

* cited by examiner

VIDEO BLIND DENOISING METHOD BASED ON DEEP LEARNING, COMPUTER EQUIPMENT AND STORAGE MEDIUM

CROSS-REFERENCE TO RELATED APPLICATIONS

The present application claims the priority of a China application No. 202010294520.3, filed on Apr. 15, 2020 and entitled "Video Blind Denoising Method and Apparatus Based on Deep Learning", which is incorporated herein by reference.

TECHNICAL FIELD

The present disclosure relates to the field of video denoising technologies, particularly to a video blind denoising method based on deep learning, a computer device and a computer-readable storage medium.

BACKGROUND

Denoising is a fundamental issue in image and video processing. Although the denoising algorithms and camera sensors have been improved over the years, there is still a lot of noise in the video capturing in low light conditions and the video using short exposure time to capture high-speed moving objects. At the same time, even under good lighting conditions, the images and videos collected by most surveillance cameras and mobile phones equipped with low-quality camera sensors will still generate a lot of noise. Therefore, denoising is an essential part of video image processing.

The general image denoising algorithm often models the image noise as an additive noise (the relationship with the signal is additive, no matter whether there is a signal or not, the noise still exists), the noise is assumed to be Gaussian white noise. Then the Gaussian white noise is added to the clean images to generate the noisy images, and the denoising model is trained in a data-driven manner. The Gaussian white noise is used to model the noise because the observation signal in the CCD/CMOS imaging system can usually be modeled as a Poisson-Gaussian joint distribution, and the Poisson-Gaussian joint distribution can be transformed by variance-stabilizing transformation (VST) into an additive white Gaussian noise. However, in many applications, obtained data does not directly come from the raw data of the imaging sensor. The output of the imaging sensor has been quantized, demosaiced, gamma corrected, compressed, etc. In addition, the video and images generated by mobile phones and other devices may also be compressed and filtered. Therefore, in many cases, the noise signal in the image or video cannot be simply modeled as additive white Gaussian noise.

In addition, existing deep learning denoising algorithms often construct denoising models in a data-driven manner. When the noise model is known, excellent denoising performance can be obtained, but when the noise model is applied to data where the noise model is unknown, the denoising performance of these models will be greatly limited. There are also different types of data with different noise distributions for mixed training, but the denoising performance is often not as good as the model obtained by training under a specific noise distribution. In addition, the noise data in the real scene and the corresponding clean data required for training the denoising model are usually difficult to obtain.

VBM3D is an extension of video denoising based on an image denoising algorithm BM3D. VBM3D uses the correlation between the time-domain and the space-domain based on the video sequence to obtain similar blocks in adjacent frames and the current frame. VBM3D algorithm can get a better compromise in denoising performance and computational complexity. The denoising effect of VBM3D often affects the accuracy of block matching due to the angle of view transformation and object motion in the video sequence, resulting in a poor denoising effect. At the same time, the VBM3D algorithm is directed at the additive white Gaussian noise. It is necessary to estimate the noise level of the noisy image first, but the noise level of the noisy image in the real scene cannot be often obtained directly, and the noise distribution does not satisfy the Gaussian distribution. Thus, the application of this algorithm has a certain limitation.

Ehret et al. proposed an unsupervised video denoising algorithm. The DnCNN network was used to pre-train Gaussian white noise data first, and then frame-by-frame training was performed on video. It can achieve blind denoising of video with unknown noise model distribution. Specifically, the traditional optical flow algorithm is used to estimate the motion between two consecutive video frames, and then the adjacent frames are mapped to the current frame for registration, thereby obtaining a pair of noisy images with the identical content, and then a training principle for denoising called noise2noise is used for the frame-by-frame training to achieve blind denoising of videos with an arbitrary noise distribution. By acquiring two adjacent frames, performing a motion compensation through the optical flow, and training this pair of images, the denoising effect can be achieved, but the denoising effect on Gaussian white noise therein is slightly inferior to directly using the pre-trained DnCNN network. In addition, only two adjacent frames are used and the time-domain information of the video sequence is not fully utilized, resulting in a certain limitation on the denoising effect. At the same time, there are certain instabilities in the denoising effect after multiple iterations of a single image in the online learning process. There is a certain fluctuation in the denoising effect between video sequences, which reduces the visual effect of the video.

SUMMARY

There are provided in the embodiments of the present disclosure a video blind denoising method based on deep learning, a computer device and a computer-readable storage medium, which solve a technical problem in the prior art that only adjacent two frames are used, and time-domain information of a video sequence is not fully used, resulting in a certain limit to the denoising effect.

An embodiment of the present disclosure provides a video blind denoising method based on deep learning, the method including:

taking a video sequence containing a preset number of frames from a video to be denoised, taking the middle frame in the video sequence as a noisy reference frame, and performing an optical flow estimation on the image corresponding to the noisy reference frame and each other frame in the video sequence to obtain optical flow fields between a plurality of two frames;

transforming, according to the optical flow fields between the plurality of two frames, the image corresponding to each other frame in the video sequence to the noisy reference frame for registration respectively, to obtain multi-frame noisy registration images; and constructing a denoising network based on a convolutional neural network, taking the multi-frame noisy registration images as an input of the convolutional neural network, taking the noisy reference frame as the reference image of the convolutional neural network, and performing a frame-by-frame iterative training and denoising by using the noise2noise training principle to obtain the denoised image corresponding to the noisy reference frame.

An embodiment of the present disclosure further provides a computer device, including a memory, a processor and a computer program stored in the memory and executed by the processor, and the processor executing the computer program to implement the following acts of:

taking a video sequence containing a preset number of frames from a video to be denoised, taking the middle frame in the video sequence as a noisy reference frame, and performing an optical flow estimation on the image corresponding to the noisy reference frame and each other frame in the video sequence to obtain optical flow fields between a plurality of two frames;

transforming, according to the optical flow fields between the plurality of two frames, the image corresponding to each other frame in the video sequence to the noisy reference frame for registration respectively, to obtain multi-frame noisy registration images; and constructing a denoising network based on a convolutional neural network, taking the multi-frame noisy registration images as an input of the convolutional neural network, taking the noisy reference frame as the reference image of the convolutional neural network, and performing a frame-by-frame iterative training and denoising by using the noise2noise training principle to obtain the denoised image corresponding to the noisy reference frame.

An embodiment of the present disclosure further provides a computer-readable storage medium storing a computer program, the computer program being used to execute the following acts of:

taking a video sequence containing a preset number of frames from a video to be denoised, taking the middle frame in the video sequence as a noisy reference frame, and performing an optical flow estimation on the image corresponding to the noisy reference frame and each other frame in the video sequence to obtain optical flow fields between a plurality of two frames;

transforming, according to the optical flow fields between the plurality of two frames, the image corresponding to each other frame in the video sequence to the noisy reference frame for registration respectively, to obtain multi-frame noisy registration images; and constructing a denoising network based on a convolutional neural network, taking the multi-frame noisy registration images as an input of the convolutional neural network, taking the noisy reference frame as the reference image of the convolutional neural network, and performing a frame-by-frame iterative training and denoising by using the noise2noise training principle to obtain the denoised image corresponding to the noisy reference frame.

In the embodiments of the present disclosure, the middle frame image in a preset number of a video sequence to be denoised is obtained as a reference frame. Using this reference frame and other frames for registration, and then using the noise2noise training principle, zero-sample learning may be performed with one video only, so as to achieve the blind denoising of video sequences without the requirements of obtaining a large amount of noise data, clean data and an accurate noise distribution model. By using a method of multi-frame fusion, time-domain information of a video sequence may be fully used, and the problem of lacking time-domain information may be solved, which helps to obtain a better denoised image quality.

BRIEF DESCRIPTION OF THE DRAWINGS

In order to more clearly explain the embodiments of the present disclosure and the technical solutions in the prior art, drawings required in the description of the embodiments or the prior art are described below in brief. Obviously, the drawings described below are merely some embodiments of the present disclosure, and for those of ordinary skills in the art, other accompanying drawings may be obtained according to these accompanying drawings without creating an inventive effort.

DETAILED DESCRIPTION OF THE INVENTION

The technical solution in the embodiments of the present disclosure is clearly and completely described below with reference to the accompanying drawings in the embodiments of the present disclosure. It is obvious that these described embodiments are merely a part of, rather than all the embodiments of the present disclosure. All other embodiments obtained by those of ordinary skills in the art based on the embodiments of the present disclosure belong to the protection scope of the present disclosure.

Figure 1:
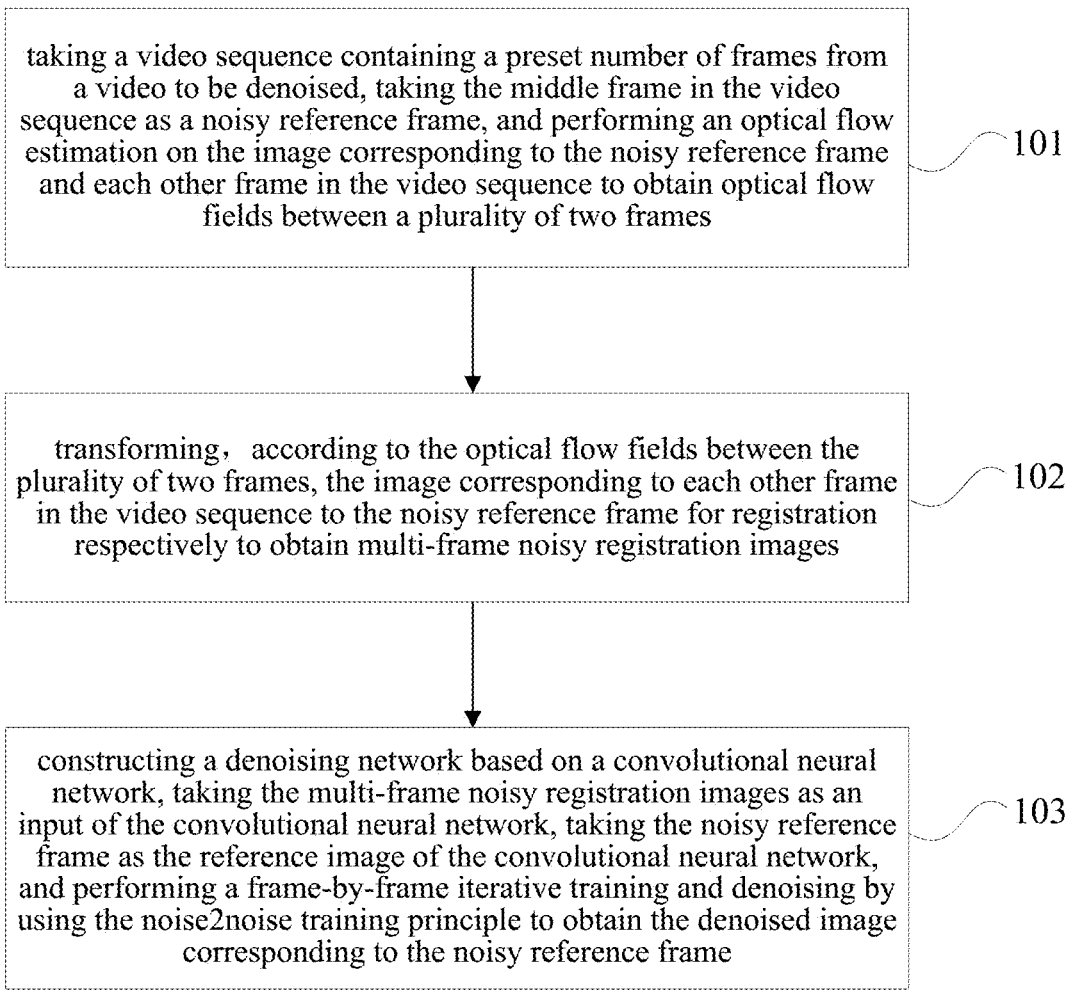
FIG. 1 is a flowchart of a video blind denoising method based on deep learning provided in an embodiment of the present disclosure.

In an embodiment of the present disclosure, there is provided a video blind denoising method based on deep learning. As shown in FIG. 1, the method includes:

step 101: taking a video sequence containing a preset number of frames from a video to be denoised, taking the middle frame in the video sequence as a noisy reference frame, and performing an optical flow estimation on the image corresponding to the noisy reference frame and each other frame in the video sequence to obtain optical flow fields between a plurality of two frames;

step 102: transforming, according to the optical flow fields between the plurality of two frames, the image corresponding to each other frame in the video sequence to the noisy reference frame for registration respectively, to obtain multi-frame noisy registration images; and step 103: constructing a denoising network based on a convolutional neural network, taking the multi-frame noisy registration images as an input of the convolutional neural network, taking the noisy reference frame as the reference image of the convolutional neural network, and performing a frame-by-frame iterative training and denoising by using the noise2noise training principle to obtain the denoised image corresponding to the noisy reference frame.

Figure 2:
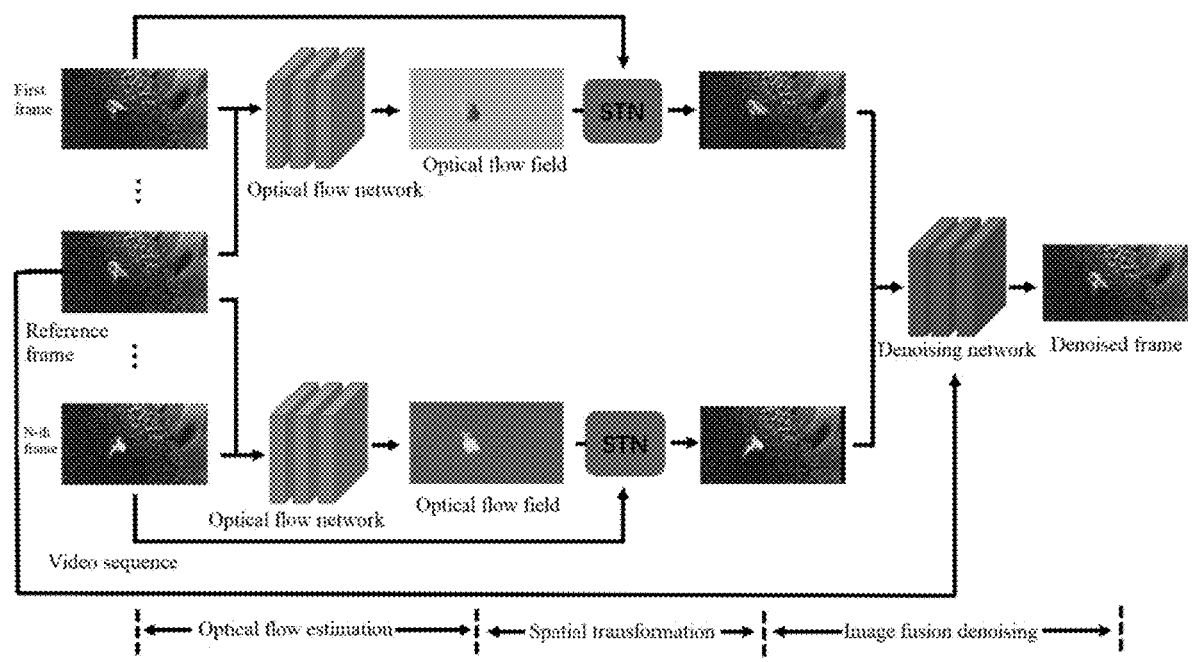
FIG. 2 is a specific flowchart of the video blind denoising method based on deep learning provided in an embodiment of the present disclosure.

In the embodiments of the present disclosure, as shown in FIG. 2 and for step 101, when the denoising is performed, N frames of video sequence in a video to be denoised are sequentially taken, and the middle frame in the video sequence is taken as the noisy reference frame. The optical flow estimation may be performed on the image corresponding to the noisy reference frame and each other frame in the video sequence by using N−1 optical flow estimation networks. These optical flow estimation networks have identical network structures and parameters, and each optical flow estimation network takes the image corresponding to one frame in the video sequence and the noisy reference frame as the input, so as to obtain a dense optical flow field between the two frames as a motion estimation.

The noisy reference frame is denoted as $I_t$, t indicates that the noisy reference frame is the t-th frame in the video sequence, other frames relative to the noisy reference frame in the N frames may be expressed as $I_{t+i}$, i being greater than 0 indicates that other frames are latter i frames relative to the noisy reference frame, and i being less than 0 indicates that other frames are former i frames relative to the noisy reference frame, hence, a value range of i is [−(N−1)/2,(N−1)/2]. A clean image corresponding to the noisy reference frame $I_t$ is denoted as $U_t$, an optical flow field from the t-th frame to a (t+i)-th frame is denoted as $v_{t,t+i}$, $I_{t+i}$ and $v_{t,t+i}$ are transformed by using spatial transformer networks (STN) to obtain $I_{t+i}^w$, and a clean image corresponding to $I_{t+i}^w$ is denoted as $U_{t+i}^w$; w denotes performing a spatial transformation on the image.

Such optical flow networks as Flownet2, SpyNet, or PWCNet may be used as the optical flow estimation networks. The optical flow estimation networks are not limited in the embodiments of the present disclosure, as long as the optical flow of former and latter frames may be achieved, and Flownet2 is preferred in this embodiment. Before performing the video denoising, the optical flow estimation network is pre-trained to obtain a pre-trained model, in which a Sintel dataset may be used, and the specific training method varies with different networks. However, the dataset used for training is not limited thereto, and pre-training weights in the open source may be used directly. The pre-training weights in the open source are preferred in this embodiment. When the video denoising is performed, the optical flow estimation network may be fine-tuned via the backward propagation, or the network weights may be frozen without updating the gradient and only using pre-trained networks for the optical flow estimation. In this embodiment, the weights of the optical flow estimation network are preferably frozen, and no backward propagation is performed to update the network weights.

Regarding the selection of N, N=11 is preferred in this example, that is, a sequence containing 11 frames is taken, a 6-th frame is taken as the noisy reference frame, and the remaining frames and the reference frames are taken as the input of the optical flow estimation networks to obtain corresponding optical flow estimation. Accurate optical flow estimation is often difficult due to issues in the video sequence, such as a change in light, motion blur, and occasion, etc., and a registered image after image transformation often has the problem that the boundary cannot be aligned with the noisy reference frame, and also missing information due to image differences between two frames of images, changing perspective. Therefore, the optical flow estimation performed on the multi-frame video sequence can compensate for the information loss resulted from the optical flow on only two frames, i.e., the former and latter frames. However, the larger the time interval between the two selected frames, the less accurate the optical flow estimation, the less effective time-domain information brought thereby, and it will also increase the complexity and calculation of the system. Thus, a balance of a magnitude of N is required.

As for the optical flow estimation, if the parameters of the optical flow estimation networks are not updated in denoising, a traditional optical flow estimation algorithm may also be used instead of the optical flow estimation networks for optical flow estimation. For example, a TV-L1 algorithm may be used for the optical flow estimation, which may also produce an excellent denoising effect.

In the embodiments of the present disclosure, as shown in FIG. 2 and for step 102, input frames may be transformed by spatial transformer networks (STN) into reference frames for registration. In particular, each spatial transformer network transforms a corresponding image in the video sequence to a view of a reference frame, and N−1 spatial transformation networks are needed for N−1 frames.

The bilinear interpolation is required in transforming the input frame into the reference frame according to the optical flow fields, and the use of the spatial transformer networks may be in a differentiable image sampling method. In performing denoising training, a gradient of a loss function may be propagated from an image denoising network back to the step of optical flow estimation, so that the optical flow estimation networks may be fine-tuned according to different videos, thereby performing an end-to-end training on the entire video denoising network.

For the image transformation part, if the entire network does not update the parameters of the optical flow estimation networks or uses a traditional optical flow estimation algorithm, the spatial transformer networks may not be used, and a traditional image processing algorithm is used by OpenCV to perform a spatial transformation of the image.

In the embodiments of the present disclosure, as shown in FIG. 2 and for step 103, a convolutional neural network is used for frame-by-frame iterative training and denoising. In particular, forming a multi-channel image by stacking N−1 frames of registered images together, and then the multi-channel image is sent to the denoising network for training. Based on a training idea of noise2noise training principle, no clean image is needed to be used as training data, while the middle frame in the N frames is taken as the noisy reference frame. In training, an online learning strategy is used to perform the frame-by-frame iterative training, and the network output is fused and averaged during the iterative training to obtain a denoised image corresponding to the noisy reference frame.

Figure 3:
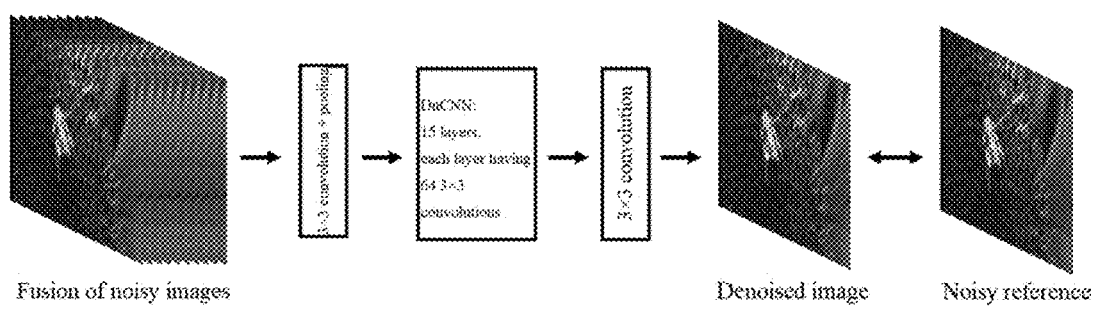
FIG. 3 is a schematic diagram of a network structure similar to the DnCNN structure.
Figure 4:
FIG. 4 is a noise image of a frame in the station2 video sequence in a Derf dataset provided in an embodiment of the present disclosure.
Figure 5:
FIG. 5 is a denoised image processed by using a VBM3D method.
Figure 6:
FIG. 6 is a denoised image processed by using the unsupervised video denoising method proposed by Ehret, et al.
Figure 7:
FIG. 7 is a denoised image processed by using the method of the present disclosure.

For the convolutional neural network, a state of the art of denoising network may be adopted, such as DnCNN, and U-Net, etc.; however, the specific convolutional neural denoising network is not limited thereto. Referring to FIG. 3, such a network similar to DnCNN structure is preferably used as the denoising network in this example. This example includes 17 convolutional layers, in which a first convolutional layer uses a 3×3 convolution kernel and uses ReLU as an activation function to output 64 feature maps. The subsequent 15 convolutional layers also use 64 3×3 convolutional kernels, and use batch normalization and ReLU for activation. The output layer of the network uses only a 3×3 convolution kernel for convolution. Unlike DnCNN, this example does not use residual learning, that is, the output of the network is an estimated denoising map instead of an estimated noise, because the input of the network is the image formed by stacking N−1 frames, and the output of the network is a denoising estimation map of the reference frame.

For an initial design of the convolutional neural network, Kaming initialization is used for the initialization of convolutional layer parameters, which can effectively avoid gradient dispersion or gradient explosion in the process of back-propagation and accelerate network convergence.

For the input and output of the convolutional neural network, the images after transformed by the STNs are stacked together. If the size of the original image is (H,W,C), where H is the height of image, W is the width of image, and C is the number of channels of image. The image with size of (H,W,(N−1)×C) is obtained after being stacked, which is denoted by $I_t^w$, and is taken as the input of the denoising network. Here, it is assumed that a clean image $U_{t+i}^w$ corresponding to which the image $I_{t+i}^w$ obtained after being transformed by the STN in the t+i frame of video sequence and a clean image $U_t$ corresponding to which the noisy reference frame $I_t$ are approximately matched at a corresponding pixel point, and noise in each frame in the N frames of the video sequence are independently and identically distributed.

Therefore, the noisy STN transformed image $I_{t+i}^w$ and the noisy reference frame $I_t$ have the same clean image and contain independent and identically distributed noise. Hence, $I_{t+i}^w$ may be taken as the input of the convolutional neural network and $I_t$ may be taken as the noisy reference frame of the convolutional neural network. The training principle of noise2noise is used without the requirement of using a clean image. It is further expanded on this basis in the present disclosure that, the N−1 frames of stacked images $I_t^w$ after being transformed by the STN in the sequence are taken as the input of the convolutional neural network, and then $I_t$ is taken as the noisy reference frame of the convolutional neural network, the same purpose of denoising can still be achieved, and a better denoising effect can be produced.

For the loss function of the convolutional neural network, when the training is performed based on the noise2noise training principle, the loss function used depends on noise distribution. If the noise distribution is known, the loss function may be selected purposefully. For example, for a Gaussian noise or a Poisson noise, the loss function $L_2$ may be used, and for a random impulse noise, the loss function $L_1$ may be used. In practical applications, a noise distribution model is usually unable to be obtained, or the noise in the video is a mixture of multiple distributions. In such a case, an optimal loss function may be determined through experiments. The loss function $L_2$ may be expressed as:

$$L_2(\tilde{I}_t^w, I_t) = \Sigma_x(\tilde{I}_t^w(x) - I_t(x))^2 \qquad (1)$$

where, $L_2(\ )$ denotes the loss function $L_2$, $I_t$ denotes a noisy reference frame, t denotes that the noisy reference frame is the t-th frame in the video sequence, $\tilde{I}_t^w$ denotes a denoised image that is output after a spatially transformed multi-channel image $I_t^w$ passes through the denoising network, x denotes a position of a pixel point in the video sequence, $I_t(x)$ denotes a pixel value of the noisy reference frame at the position x, and $\tilde{I}_t^w(x)$ denotes a pixel value of the denoised image at the position x.

In addition, an occlusion area of the optical flow field usually exists in the image after being transformed by the STN, that is, when calculating optical flow from $I_t$ to $I_{t+i}$, it is possible that an area occurring in $I_t$ does not occur in $I_{t+i}$, but a calculated optical flow field $v_{t,t+i}$ may still have an assignment in this area. An area with an absolute value of the optical flow divergence greater than a set threshold may be denoted as an occasional area. Hence, a binarized occlusion mask may be defined as:

$$M_{t,t+i}(x) = \begin{cases} 0 & \text{if } |divv_{t,t+1}(x)| > \tau \\ 1 & \text{if } |divv_{t,t+1}(x)| \le \tau \end{cases} \qquad (2)$$

where, $v_{t,t+i}$ is an optical flow field from a noisy reference frame $v_{t,t+i}$ to a (t+i)-th frame, $M_{t,t+i}$ is an occlusion mask corresponding to the optical flow field, r is a set threshold, and div denotes a divergence.

Hence, the occlusion masks corresponding to N−1 optical flow fields $v_{t,t+i}$ are summed and averaged to obtain a final occlusion mask $M_t$. When a loss is calculated, the mask is used to shield the occlusion part from participating in the calculation of the loss function. In addition, zoom of a lens, movement of a camera back and forth, and movement of objects, etc., bring changes in the field of view of a picture, which often results in that the optical flow estimation networks cannot obtain optical flow fields with effective edges. The value of an image edge of the obtained occlusion mask is always 0. Hence, a loss at the image edge is unable to be obtained, thereby affecting the denoising of the image edge. Therefore, in the present disclosure, a certain width of the edge of the block mask is filled to be 1, thereby avoiding severe distortion at the edge of the denoised image. Thus, the loss function $L_2$ may be expressed as:

$$L_2(\tilde{I}_t^w, I_t, M_t) = \Sigma M_t(x)(\tilde{I}_t^w(x) - I_t(x))^2 \qquad (3)$$

For the training of the convolutional neural network, the idea of online learning is used to train frame by frame, that is, iterate the same image multiple times, and the number of iterations for one frame is set to be Epochs. If Epochs is set to be too large, it is possible to result in over-fitting of the network, that is, as the number of times of iteration increases, the denoising effect will gradually be deteriorated, and if Epochs is set to be too small, under-fitting of the network will be resulted, and an optimal denoising effect cannot be achieved. At the same time, for different videos, video scenarios and noise distributions may be different, so optimal choices of Epochs will also be different. In this example, a value range of Epochs is between 25 and 100, and the specific value may be obtained through experimental observation. In addition, in the process of iteration of the same frame, a PSNR (peak signal to noise ratio) of the denoised image outputted by the convolutional neural network will have certain fluctuations. In order to reduce such fluctuations, the output images are summed and averaged in the iteration process in the present disclosure to obtain the final denoised image, which may balance the under-fitting at the beginning of the iteration and subsequent over-fitting, and may also eliminate the influence of the floating denoising effect in the training process. In comparison with using the denoised image generated after a certain number of times of iteration, it may obtain a better denoising effect and a better visual effect. Moreover, at the same time, frame-by-frame training may effectively deal with noise changes caused by the changes in the environment, and weather, etc. during the video acquisition process. In a way, it can realize lifelong learning.

In the embodiments of the present disclosure, for optical flow estimation and image transformation, if the parameters of the optical flow estimation network are not updated during denoising or a traditional optical flow estimation algorithm is used, frame-by-frame optical flow estimation may be performed on the entire video sequence before the denoising is performed, and the registration image and occlusion mask obtained after the image transformation may be saved in a computer hard disk. And subsequent denoising algorithms may directly invoke the previously saved registration image and occlusion mask, thereby avoiding repeated optical flow estimation and image transformation possibly performed during the denoising process, and saving the calculation resources and time.

For the multi-frame fusion denoising part, in addition to using online learning to sequentially denoise each frame of the video sequence, an offline learning method can also be used to perform multiple rounds of iterative training on the entire video sequence frame-by-frame. Training the entire video sequence once is an iteration. The weights of the convolutional neural network are updated through multiple rounds of frame-by-frame iterations to obtain the convolutional neural network corresponding to the noisy reference frame, and finally using the convolutional neural network corresponding to the noisy reference frame to test the entire video sequence (multi-frame noisy registration images and the noisy reference frame), to obtain the denoised video sequence.

For the multi-frame fusion denoising part, the occlusion mask part may not be used in the design of the loss function. Due to the use of multi-frame image for fusion, the information has a certain redundancy, and the denoising network also has certain robustness. Hence, an even better denoising effect may also be obtained.

The following examples illustrate the advantages of the method of the present disclosure.

Referring to Table 1, different algorithms are used to compare the PSNR quantization indexes used for denoising the 7 video sequences selected from a Derf dataset. Regarding the generation of noise sequences, first of all, a grayscale of the video sequence is obtained by average R, G, B channel components, and then down-sampling 2 times is performed to ensure that there is no noise in the video sequence. Then a Gaussian white noise of σ=25 is added, and then JPEG compression is performed with a mass factor of 10 to obtain a corresponding noise video sequence. As shown in Table I, Ehret algorithm denotes the unsupervised video denoising algorithm proposed by Ehret, et al., Proposed-TVL1 denotes a video denoising algorithm constructed by using the traditional TV-L1 optical flow estimation algorithm in the method of the present disclosure, and Proposed-Flownet2 denotes a video denoising algorithm constructed by using a Flownet2 based on deep learning in the method of the present disclosure. Bolds in the table indicate algorithms that obtain the highest PNSR in a current video.

It can be concluded that in the present disclosure achieves a large improvement of PSNR in all seven videos.

FIGS. 4-7 respectively show a noise image of a frame in a station2 video sequence in the Derf dataset, and denoised image by respectively using the VBM3D method, the unsupervised video denoising algorithm proposed by Ehret, et al. and the processing of the present disclosure. The added noise is identical to the noise in Table 1. It can be seen from a visual effect that even though noise distribution and noise level are not known in the present disclosure, nor pre-training for denoising is performed, a good denoising effect may be obtained, and rails and overhead trolley bus lines can be clearly seen from FIG. 7; while in VBM3D, under a condition that a noise level is set to be 25, there are multiple artifacts in the denoising effect (FIG. 5), and the denoising effect of the unsupervised video denoising algorithm proposed by Ehret, et al. (FIG. 6) is too blurry, losing a lot of detailed information of images.

It can be seen that the present disclosure can significantly improve clarity of details of the image after video denoising, enhance the recognizability of the image to human eyes, improve the subjective quality of the image, and improve objective indices at the same time.

An embodiment of the present disclosure provides a computer device, which may be a desktop computer, a tablet computer, and a mobile terminal, etc., and this embodiment is not limited thereto. In this embodiment, the computer device may implement the video blind denoising method based on deep learning.

Figure 8:
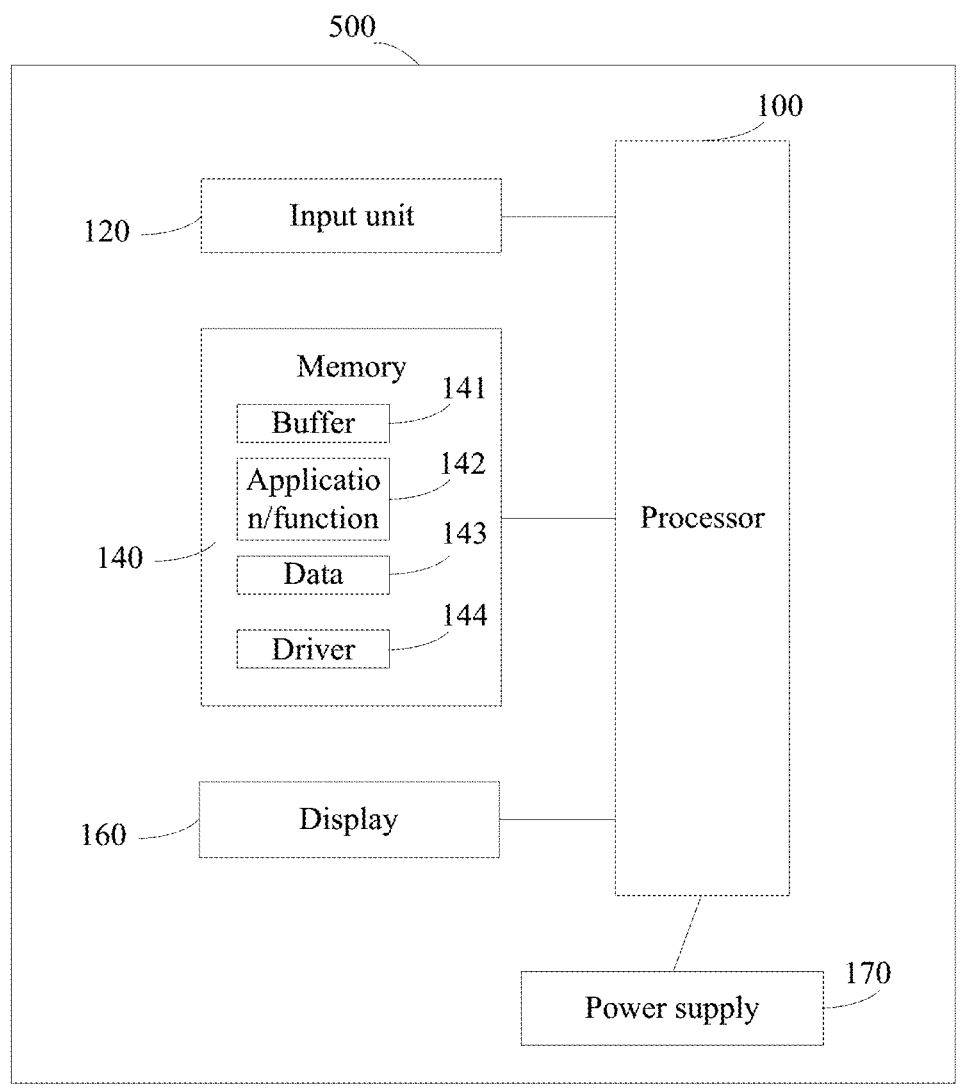
FIG. 8 is a block diagram of a structure of a video blind denoising apparatus based on deep learning provided in an embodiment of the present disclosure.

FIG. 8 is a block diagram of a systematic structure of the computer device 500 according to the embodiments of the present disclosure. As shown in FIG. 8, the computer device 500 may include a processor 100 and a memory 140 coupled to the processor 100. It should be noted that this figure is illustrative only, and other types of structures may also be used to supplement or replace this structure and achieve a telecommunications function or other functions.

In an implementation, functions of video blind denoising based on deep learning may be integrated into the processor 100. Herein, the processor 100 may be configured to perform the following controls of:

taking a video sequence containing a preset number of frames from a video to be denoised, taking the middle frame in the video sequence as a noisy reference frame, and performing an optical flow estimation on the image corresponding to the noisy reference frame and each other frame in the video sequence to obtain optical flow fields between a plurality of two frames;

transforming, according to the optical flow fields between the plurality of two frames, the image corresponding to each other frame in the video sequence to the noisy reference frame for registration respectively, to obtain multi-frame noisy registration images; and

TABLE 1

| Algorithm | Video sequence | | | | | | | Average value |
| --- | --- | --- | --- | --- | --- | --- | --- | --- |
| | Walk | Crowd | Football | Station | Park joy | Sunflower | Tractor | |
| Ehret algorithm | 32.84 | 27.21 | 34.28 | 31.03 | 26.80 | 33.51 | 30.04 | 30.82 |
| Proposed-TVL1 | 33.11 | 28.54 | 35.20 | 35.06 | 28.08 | 36.53 | 31.61 | 32.59 |
| Proposed-Flownet2 | 33.43 | 28.84 | 35.15 | 35.84 | 28.85 | 37.01 | 31.99 | 33.02 |
| Improvement of PSNR | +0.59 | +1.63 | +0.92 | +4.81 | +2.05 | +3.50 | +1.95 | +2.20 | constructing a denoising network based on a convolutional neural network, taking the multi-frame noisy registration images as an input of the convolutional neural network, taking the noisy reference frame as the reference image of the convolutional neural network, and performing a frame-by-frame iterative training and denoising by using the noise2noise training principle to obtain the denoised image corresponding to the noisy reference frame.

Herein, the processor executes the computer program to implement the following controls of:

performing the optical flow estimation on the image corresponding to the noisy reference frame and each other frame in the video sequence by using optical flow estimation networks; and transforming the image corresponding to each other frame in the video sequence to the noisy reference frame for registration respectively through spatial transformer networks, to obtain the multi-frame noisy registration images.

Herein, the processor executes the computer program to implement the following controls of:

performing an optical flow estimation on the reference image and each other frame in a preset number of frames of video images by using an optical flow estimation algorithm; and transforming the image corresponding to each other frame in the video sequence to the noisy reference frame for registration respectively by using an image processing algorithm.

Herein, the processor executes the computer program to implement the following controls of:

the number of the optical flow estimation networks being a preset number minus 1, and the preset number minus 1 optical flow estimation networks having identical network structures and parameters;

taking the image corresponding to the noisy reference frame and each other frame in the video sequence as an input of the optical flow estimation networks, and obtaining an optical flow field between a two-frame image by performing the optical flow estimation; and obtaining optical flow fields between the preset number minus 1 two frames for the preset number minus 1 optical flow estimation network.

Herein, the processor executes the computer program to implement the following controls of:

pre-training the optical flow estimation networks to obtain a pre-trained model.

Herein, the processor executes the computer program to implement the following controls of:

the number of the spatial transformer networks being a preset number minus 1; transforming the image corresponding to the other frame in the video sequence to the noisy reference frame for registration by using each spatial transformer network, to obtain a registered video sequence; and obtaining the preset number minus 1 registered video sequences for the preset number minus 1 spatial transformer networks.

Herein, the processor executes the computer program to implement the following controls of:

forming a multi-channel image by stacking the multi-frame noisy registration images together; and taking the multi-channel image as an input of the convolutional neural network, taking the noisy reference frame as the reference image of the convolutional neural network, performing the frame-by-frame iterative training and denoising by using the noise2noise training principle, and summing and averaging output denoised image of the denoising network in a whole process of iterative training of each frame to obtain the final denoised image of the noisy reference frame.

Herein, the processor executes the computer program to implement the following controls of:

adopting the formula (1) as the loss function in the convolution neural network.

Herein, the processor executes the computer program to implement the following controls of:

determining an optical flow divergence according to the optical flow fields;

comparing an absolute value of the optical flow divergence with a set threshold, and marking an area with the absolute value of the optical flow divergence greater than the set threshold as an occlusion area of the optical flow fields;

defining a binarized occlusion mask according to the occlusion area;

summing and averaging the binarized occlusion masks to which the optical flow fields between the plurality of two frames correspond to obtain a final occlusion mask; and determining the loss function in the convolutional neural network according to the final occlusion mask.

Herein, the processor executes the computer program to implement the following controls of:

defining a binarized occlusion mask according to formula (2).

Herein, the processor executes the computer program to implement the following controls of:

adopting formula (3) as the loss function.

In another implementation, the functions of the video blind denoising based on deep learning and the processor 100 may be configured separately; for example, the functions of the video blind denoising based on deep learning may be configured in a chip connected to the processor 100, and the functions of the video blind denoising based on deep learning are executed under control of the processor.

As shown in FIG. 8, the computer device 500 may further include an input unit 120, a display 160, and a power supply 170. It should be noted that the computer device 500 does not necessarily include all the parts shown in FIG. 8, and furthermore, the computer device 500 may include parts not shown in FIG. 8, which may refer to the prior art.

Herein, the processor 100 is sometimes referred to as a controller or a control component, which may include a microprocessor or other processor apparatuses and/or logic apparatuses, and the processor 100 receives input and controls operations of every component of the computer device 500.

The input unit 120 provides an input to the processor 100. The input unit 120 is, for example, a button or touch input apparatus.

The memory 140 may be, for example, one or more of buffer memories, a flash memory, a hard drive, a mobile medium, a volatile memory, a nonvolatile memory, or other suitable apparatuses, which may store the program for executing related information, and the processor 100 may execute the programs stored in the memory 140, so as to realize information storage or processing, etc.

The memory 140 may be a solid-state memory, such as a read only memory (ROM), a random access memory (RAM), and a SIM card, etc. It may also be a memory that saves information even when the power is turned off, and can be selectively erased and provided with more data, and an example of this memory is sometimes referred to as an EPROM or the like. The memory 140 may also be a device of another type. The memory 140 includes a buffer memory 141 (sometimes referred to as a buffer). The memory 140 may include an application/function storage portion 142 for storing applications and function programs or a flow for performing operations of an electronic device by the processor 100.

The memory 140 may further include a data storage portion 143 for storing data, such as contacts, digital data, pictures, sounds, and/or any other data used by an electronic device. A driver storage portion 144 of the memory 140 may include various drivers of the electronic device for communications functions and/or for performing other functions of the electronic device (such as messaging applications, address book applications, etc.).

The display 160 is used for displaying display objects such as images and characters, etc. The display may be, for example, an LCD display; however, it is not limited thereto.

The power supply 170 is used to provide power to the computer device 500.

An embodiment of the present disclosure provides a computer-readable storage medium storing a computer program, the computer program being used to execute the following acts of:

taking a video sequence containing a preset number of frames from a video to be denoised, taking the middle frame in the video sequence as a noisy reference frame, and performing an optical flow estimation on the image corresponding to the noisy reference frame and each other frame in the video sequence to obtain optical flow fields between a plurality of two frames;

transforming, according to the optical flow fields between the plurality of two frames, the image corresponding to each other frame in the video sequence to the noisy reference frame for registration respectively, to obtain multi-frame noisy registration images; and constructing a denoising network based on a convolutional neural network, taking the multi-frame noisy registration images as an input of the convolutional neural network, taking the noisy reference frame as the reference image of the convolutional neural network, and performing a frame-by-frame iterative training and denoising by using the noise2noise training principle to obtain the denoised image corresponding to the noisy reference frame.

The computer-readable storage medium may include a physical device used for storing information which may be stored in a media using electronic, magnetic or optical manners after being digitized. The computer-readable storage medium according to this embodiment may include: an apparatus storing information in an electric power manner, such as various types of memories, e.g. an RAM, and an ROM, etc.; an apparatus storing information in a magnetic power manner, such as a hard disk, a floppy disk, a magnetic tape, a magnetic-core memory, a bubble memory, and a USB flash disk; and an apparatus storing information in an optical manner, such as a CD, or a DVD, etc. Of course, there may be readable memory media in other manners, such as a quantum memory, and a graphene memory, etc.

In summary, the video blind denoising method based on deep learning, computer device and computer-readable storage medium proposed in the present disclosure have the following advantages:

using an optical flow estimation and an image changing method, the optical flow estimation and the image registration are performed on the former and latter frames in the video sequence, and then through the noise2noise training principle, a zero-sample learning may be performed with one video only, so as to achieve the blind denoising of the video sequence, without the requirements of obtaining a large amount of noise data and clean data, nor the requirements of obtaining an accurate noise distribution model. By using the multi-frame fusion method, the time-domain information of the video sequence may be fully used, the problems of lacking time-domain information caused by the change of the field of view due to zoom of a lens, movement of a camera back and forth, and movement of objects, etc. can be solved, which is helpful for obtaining a better denoised image quality. Through online learning, the video is denoised by frame-by-frame training, which effectively solves the problem that a trained model is invalid due to changes in the noise distribution during the video acquisition process. Through the averaging strategy, the results of the denoising network are summed and averaged to effectively balance the problems of over-fitting and under-fitting in the online learning process, stabilize the fluctuations of the network output, obtain a better denoising effect, and improve the continuity and consistence of the denoising effects between the video frames.

Those skilled in the art will appreciate that embodiments of the present disclosure may be provided as a method, system, or computer program product. Therefore, the embodiments of the present disclosure can take the form of a full hardware embodiment, a full software embodiment or an embodiment containing both hardware and software elements. Moreover, the present disclosure can be in a form of one or more computer program products containing the computer-executable codes which can be implemented in the computer-executable non-transitory storage media (including but not limited to disk memory, CD-ROM, optical memory, etc.).

The present disclosure is described with reference to the flow charts and/or block diagrams of the method, device (system) and computer program product according to the embodiments of the present disclosure. It shall be understood that each flow and/or block in the flowcharts and/or block diagrams and a combination of the flows and/or blocks in the flowcharts and/or block diagrams can be implemented by computer program instructions. These computer program instructions can be provided to a general purpose computer, a special purpose computer, an embedded processor, or a processor of other programmable data processing devices so as to generate a machine for generating means for implementing the functions of one or more flows of a flowchart and/or one or more blocks of a block diagram by using the instructions executed by the computer or the processor of other programmable data processing devices.

These computer program instructions can also be stored in a computer readable memory guiding the computer or other programmable data processing devices to work in a particular way, such that the instructions stored in the computer readable memory generate an article of manufacture containing instruction means which implements the functions of one or more flows of a flowchart and/or one or more blocks in a block diagram.

These computer program instructions can also be loaded onto a computer or other programmable data processing devices such that a series of operational steps are performed on a computer or other programmable devices to produce computer-implemented processing, so that the instructions executed on a computer or other programmable devices provide steps for implementing the functions of one or more flows of a flowchart and/or one or more blocks of a block diagram.

The above content is only preferred embodiments of this present disclosure, and cannot be used for limiting the present disclosure. Any modification, equivalent replacement and improvement, etc. within the spirit and principle of the present disclosure shall be contained in the scope of protection of the present disclosure.

What is claimed is:

1. A video blind denoising method based on deep learning, comprising:
   taking a video sequence containing a preset number of frames from a video to be denoised, taking the middle frame in the video sequence as a noisy reference frame, and performing an optical flow estimation on an image corresponding to the noisy reference frame and each other frame in the video sequence to obtain optical flow fields between a plurality of frame pairs;
   transforming, according to the optical flow fields between the plurality of frame pairs, an image corresponding to each other frame in the video sequence to the noisy reference frame for registration respectively, to obtain multi-frame noisy registration images; and
   constructing a denoising network based on a convolutional neural network, taking the multi-frame noisy registration images as an input of the convolutional neural network, taking the noisy reference frame as the reference image of the convolutional neural network, and performing a frame-by-frame iterative training and denoising by using the noise2noise training principle to obtain a denoised image corresponding to the noisy reference frame.

2. The video blind denoising method based on deep learning according to claim 1, wherein said performing the optical flow estimation on the image corresponding to the noisy reference frame and each other frame in the video sequence comprises:
   performing the optical flow estimation on the image corresponding to the noisy reference frame and each other frame in the video sequence by using optical flow estimation networks;
   wherein said transforming the image corresponding to each other frame in the video sequence to the noisy reference frame for registration respectively comprises:
   transforming the image corresponding to each other frame in the video sequence to the noisy reference frame for registration respectively through spatial transformer networks, to obtain the multi-frame noisy registration images.

3. The video blind denoising method based on deep learning according to claim 1, wherein said performing the optical flow estimation on the image corresponding to the noisy reference frame and each other frame in the video sequence comprises:
   performing the optical flow estimation on the image corresponding to the noisy reference frame and each other frame in the video sequence by using an optical flow estimation algorithm;
   wherein said transforming the image corresponding to each other frame in the video sequence to the noisy reference frame for registration respectively comprises:
   transforming the image corresponding to each other frame in the video sequence to the noisy reference frame for registration respectively by using an image processing algorithm.

4. The video blind denoising method based on deep learning according to claim 2, wherein the number of the optical flow estimation networks is a preset number minus 1, and the preset number minus 1 optical flow estimation networks have identical network structures and parameters;
   wherein said performing the optical flow estimation on the image corresponding to the noisy reference frame and each other frame in the video sequence by using optical flow estimation networks comprises:
   taking the image corresponding to the noisy reference frame and each other frame in the video sequence as an input of the optical flow estimation networks, and obtaining an optical flow field between frame pairs by performing the optical flow estimation; and
   obtaining optical flow fields between the preset number minus 1 frame pairs for the preset number minus 1 optical flow estimation networks.

5. The video blind denoising method based on deep learning according to claim 2, wherein before performing the optical flow estimation, the method further comprises:
   pre-training the optical flow estimation networks to obtain a pre-trained model.

6. The video blind denoising method based on deep learning according to claim 4, wherein the number of the spatial transformer networks is a preset number minus 1;
   wherein said transforming the image corresponding to each other frame in the video sequence to the noisy reference frame for registration respectively through spatial transformer networks, to obtain the multi-frame noisy registration images comprises:
   transforming the image corresponding to the other frame in the video sequence to the noisy reference frame for registration by using each spatial transformer network to obtain a registered video sequence; and
   obtaining the preset number minus 1 registered video sequences for the preset number minus 1 spatial transformer networks.

7. The video blind denoising method based on deep learning according to claim 1, wherein said taking the multi-frame noisy registration images as the input of the convolutional neural network, taking the noisy reference frame as the reference image of the convolutional neural network, and performing a frame-by-frame iterative training and denoising by using a noise2noise training principle to obtain the denoised image corresponding to the noisy reference frame comprises:
   forming a multi-channel image by stacking the multi-frame noisy registration images together; and
   taking the multi-channel image as an input of the convolutional neural network, taking the noisy reference frame as the reference image of the convolutional neural network, performing the frame-by-frame iterative training and denoising by using the noise2noise training principle, and summing and averaging output denoised images of the denoising network in a whole process of iterative training of each frame to obtain the denoised image of the noisy reference frame.

8. The video blind denoising method based on deep learning according to claim 7, wherein a loss function in the convolutional neural network is:

$$L_2(\tilde{I}_t^w, I_t) = \Sigma_x (\tilde{I}_t^w(x) - I_t(x))^2;$$

where, $L_2(\ )$ denotes a loss function of $L_2$, $I_t$ denotes a noisy reference frame, t denotes that the noisy reference frame is the t-th frame in the video sequence, $\tilde{I}_t^w$ denotes a denoised image that is output after a spatially transformed multi-channel image $I_t^w$ passes through the denoising network, and x denotes a position of a pixel point in the video sequence.

9. The video blind denoising method based on deep learning according to claim 7, further comprising:
   determining an optical flow divergence according to the optical flow fields;

comparing an absolute value of the optical flow divergence with a set threshold, and marking an area with the absolute value of the optical flow divergence greater than the set threshold as an occlusion area of the optical flow fields;

defining a binarized occlusion mask according to the occlusion area;

summing and averaging the binarized occlusion masks to which the optical flow fields between the plurality of two frames correspond to obtain a final occlusion mask; and determining the loss function of the convolutional neural network according to the final occlusion mask.

10. The video blind denoising method based on deep learning according to claim 9, wherein the binarized occlusion mask is defined in a manner as follows:

$$M_{t,t+i}(x) = \begin{cases} 0 & \text{if } |divv_{t,t+1}(x)| > \tau \\ 1 & \text{if } |divv_{t,t+1}(x)| \leq \tau \end{cases};$$

where, $v_{t,t+i}$ is an optical flow field from a noisy reference frame to a (t+i)-th frame, $M_{t,t+i}$ is an occlusion mask to which the optical flow field correspond, $\tau$ is the set threshold, div denotes a divergence, x denotes the position of the pixel point in the video sequence, i being greater than 0 indicates that the other frames are latter i frames relative to the noisy reference frame, i being less than 0 indicates that the other frames are former i frames relative to the noisy reference frame, a value range of i is [−(N−1)/2,(N−1)/2], and N denotes the number of frames in the video sequence.

11. The video blind denoising method based on deep learning according to claim 10, wherein the loss function is:

$$L_2(\tilde{I}_t^w, I_t, M_t) = \Sigma_x M_t(x)(\tilde{I}_t^w(x) - I_t(x))^2;$$

where, $L_2( )$ denotes a loss function of $L_2$, $I_t$ denotes a noisy reference frame, t denotes that the noisy reference frame is the t-th frame in the video sequence, $\tilde{I}_t^w$ denotes a denoised image that is output after a spatially transformed multi-channel image $I_t^w$ passes through the denoising network, x denotes a position of a pixel point in the video sequence, and $M_t$ denotes an occlusion mask obtained by averaging the occlusion masks to which plurality of optical flow fields correspond.

12. A computer device, comprising a memory, a processor and a computer program stored in the memory and executed by the processor, wherein the processor executes the computer program to implement the following acts of:

taking a video sequence containing a preset number of frames from a video to be denoised, taking the middle frame in the video sequence as a noisy reference frame, and performing an optical flow estimation on an image corresponding to the noisy reference frame and each other frame in the video sequence to obtain optical flow fields between a plurality of frame pairs;

transforming, according to the optical flow fields between the plurality of frame pairs, an image corresponding to each other frame in the video sequence to the noisy reference frame for registration respectively, to obtain multi-frame noisy registration images; and constructing a denoising network based on a convolutional neural network, taking the multi-frame noisy registration images as an input of the convolutional neural network, taking the noisy reference frame as the reference image of the convolutional neural network, and performing a frame-by-frame iterative training and denoising by using the noise2noise training principle to obtain a denoised image corresponding to the noisy reference frame.

13. The computer device according to claim 12, wherein the processor executes the computer program to implement the following acts of:

performing the optical flow estimation on the reference the image corresponding to the noisy reference frame and each other frame in the video sequence by using optical flow estimation networks; and transforming the image corresponding to each other frame in the video sequence to the noisy reference frame for registration respectively through spatial transformer networks, to obtain a plurality of registered video images.

14. The computer device according to claim 12, wherein the processor executes the computer program to implement the following acts of:

performing the optical flow estimation on the reference the image corresponding to the noisy reference frame and each other frame in the video sequence by using an optical flow estimation algorithm; and transforming the image corresponding to each other frame in the video sequence to the noisy reference frame for registration respectively by using an image processing algorithm.

15. The computer device according to claim 13, wherein the processor executes the computer program to implement the following acts of:

the number of the optical flow estimation networks being a preset number minus 1, and the preset number minus 1 optical flow estimation networks having identical network structures and parameters;

taking the image corresponding to the noisy reference frame and each other frame in the video sequence as an input of the optical flow estimation networks, and obtaining an optical flow field between frame pairs performing the optical flow estimation; and obtaining optical flow fields between the preset number minus 1 frame pairs for the preset number minus 1 optical flow estimation network.

16. The computer device according to claim 13, wherein the processor executes the computer program to implement the following acts of:

pre-training the optical flow estimation networks to obtain a pre-trained model.

17. The computer device according to claim 15, wherein the processor executes the computer program to implement the following acts of:

the number of the spatial transformer networks being a preset number minus 1;

transforming the image corresponding; to the other frame in the video sequence to the noisy reference frame for registration by using each spatial transformer network to obtain a registered video sequence; and obtaining the preset number minus 1 registered video sequences for the preset number minus 1 spatial transformer networks.

18. The computer device according to claim 12, wherein the processor executes the computer program to implement the following acts of:

forming a multi-channel image by stacking the multi-frame noisy registration images together; and taking the multi-channel image as the input of the convolutional neural network, taking the noisy reference frame as the reference image of the convolutional neural network, performing the frame-by-frame iterative training and denoising by using the noise2noise training principle, and summing and averaging output denoised image of the denoising network in a whole process of iterative training of each frame to obtain the denoised image of the noisy reference frame.

19. The computer device according to claim 18, wherein the processor executes the computer program to implement the following acts of:
- determining an optical flow divergence according to the optical flow fields;
- comparing an absolute value of the optical flow divergence with a set threshold, and marking an area with the absolute value of the optical flow divergence greater than the set threshold as an occlusion area of the optical flow fields;
- defining a binarized occlusion mask according to the occlusion area;
- summing and averaging the binarized occlusion masks to which the optical flow fields between the plurality of two frames correspond to obtain a final occlusion mask to obtain a final occlusion mask; and
- determining the loss function in the convolutional neural network according to the final occlusion mask.

20. A non-transitory computer-readable storage medium, wherein the computer-readable storage medium stores a computer program, and the computer program is used to execute the following acts of:
- taking a video sequence containing a preset number of frames from a video to be denoised, taking the middle frame in the video sequence as a noisy reference frame, and performing an optical flow estimation on an image corresponding to the noisy reference frame and each other frame in the video sequence to obtain optical flow fields between a plurality of frames pairs;
- transforming, according to the optical flow fields between the plurality of frame pairs, an image corresponding to each other frame in the video sequence to the noisy reference frame for registration respectively, to obtain multi-frame noisy registration images; and
- constructing a denoising network based on a convolutional neural network, taking the multi-frame noisy registration images as an input of the convolutional neural network, taking the noisy reference frame as the reference image of the convolutional neural network, and performing a frame-by-frame iterative training and denoising by using the noise2noise training principle to obtain a denoised image corresponding to the noisy reference frame.

* * * * *

UNITED STATES PATENT AND TRADEMARK OFFICE
CERTIFICATE OF CORRECTION

PATENT NO. : 11,216,914 B2
APPLICATION NO. : 16/861052
DATED : January 4, 2022
INVENTOR(S) : Xiang Xie et al.

It is certified that error appears in the above-identified patent and that said Letters Patent is hereby corrected as shown below:

In the Claims

Claim 11, Column 17, Lines 36-37 replace the equation after "function is:" with:

$$L_2\left(\tilde{I}_t^w, I_t\right) = \sum_x \left(\tilde{I}_t^w(x) - I_t(x)\right)^2$$

Signed and Sealed this
Second Day of May, 2023

Katherine Kelly Vidal
*Director of the United States Patent and Trademark Office*